Aug. 14, 1928.
K. E. PEILER
1,680,391
MOLD CHARGE GUIDE FOR GLASS FEEDING APPARATUS
Filed Dec. 3, 1923
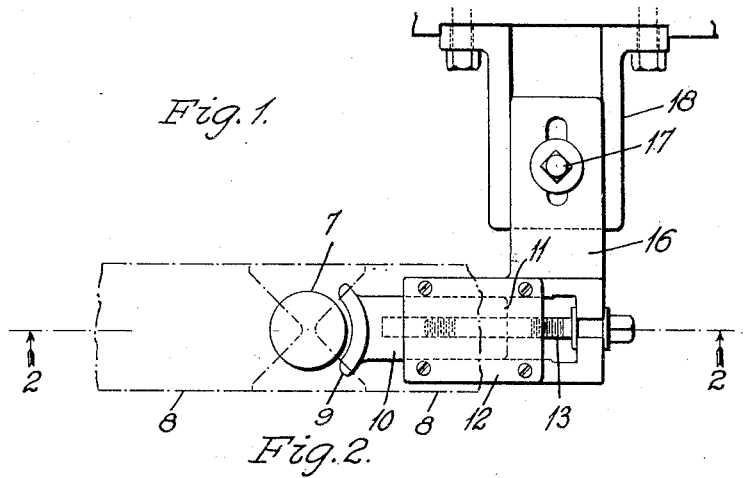
Fig. 1.
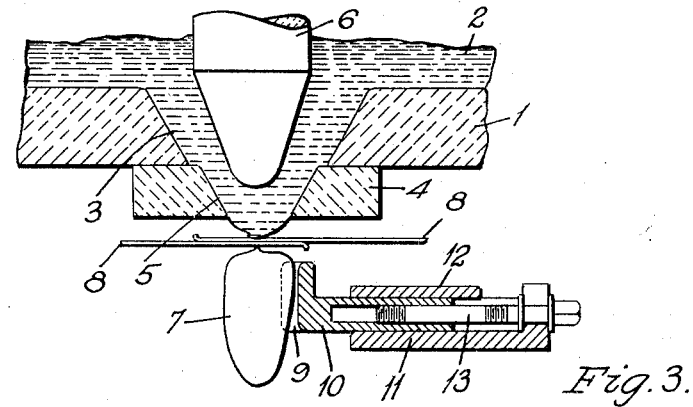
Fig. 2.
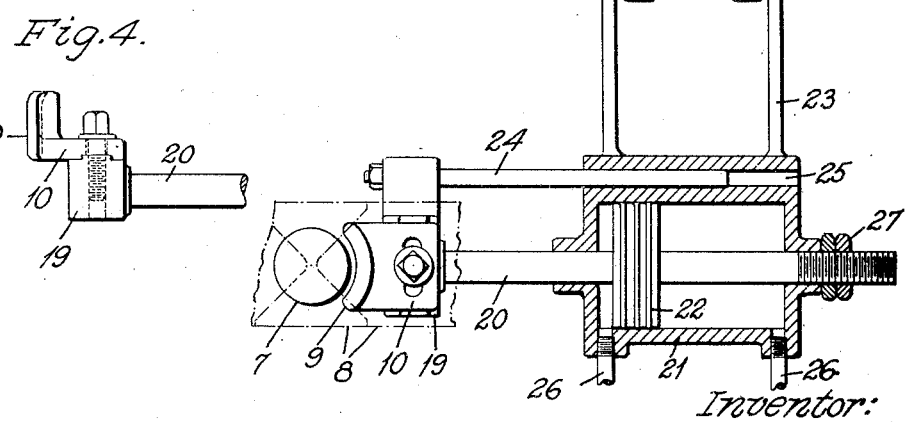
Fig. 4.
Fig. 3.
Witness:
S. S. Grotta
Inventor:
Karl E. Peiler
by W. H. Honiss
Atty.

Patented Aug. 14, 1928.

1,680,391

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

MOLD-CHARGE GUIDE FOR GLASS-FEEDING APPARATUS.

Application filed December 3, 1923. Serial No. 678,130.

The invention relates to glass feeding apparatus and it has particular relation to elements for steadying and guiding mold charges during and after their severance by the shearing mechanism.

In glass feeding apparatus, embodying a severing device consisting of a pair of overlapping shear blades, there is a tendency for the closing movement of the lowermost blade to impart a lateral motion to the upper portion of the mold charge at the moment of its severance from the body or column of glass. This action of the shear blades, which is known as "batting", tilts or displaces the mold charge to such an extent as to cause it to deliver imperfectly into a mold, or onto a delivery chute.

One of the objects of the present invention is to provide a mold charge guide which is mounted independently of the severing device and which is adapted to occupy a stationary operative position adjacent to the mold charge during at least a portion of the severing operation and which will provide an abutment for minimizing lateral motion imparted to the mold charge by the action of the shear blade.

Another object of the invention is to provide a device, of the character described, which is mounted for adjustment toward and away from the feeding axis of the feeding mechanism independently of the overlap and position adjustment of the shear blades, and which may be quickly detached from its mounting for substitution by a guide of a size and shape approximately conforming to that of the mold charge being delivered by the feeder.

A further object of the invention is to provide a device of the character described which is movable towards and away from the feeding axis of the apparatus independently of the operation of the shearing mechanism, and which is provided with a dwell of sufficient duration at the limit of its inward movement to remain in proximity to the mold charge during severance.

Further objects of the invention include such novel features of construction and arrangement as are disclosed in the accompanying specification and drawings.

Figure 1 is a plan view of a mold charge guide constructed in accordance with the invention;

Fig. 2 is a sectional elevation of the mold charge guide taken on line 2—2 of Fig. 1;

Fig. 3 is a sectional plan view of another embodiment of the invention; and

Fig. 4 is a side elevational view of the guide illustrated in Fig. 3.

The invention may be employed in connection with any suitable type of drop or gob feeding apparatus embodying a shearing device and for the purpose of illustration such apparatus is shown as comprising a forehearth 1, containing a body of molten glass 2, and having an outlet 3. An outlet ring 4, secured to the lower side of the forehearth 1, is provided with an orifice 5 in registry with the opening 4. A plunger or needle 6 operates within the forehearth and is adapted to control the flow of the molten glass through the orifice 5. When a predetermined quantity of glass has emerged from the orifice it is severed, to provide a drop or mold charge 7 of the required shape and size, by a pair of cooperating shear blades 8, which are mounted for operation beneath the orifice 5.

In order to prevent the mold charge from being tilted or displaced laterally after its severance, through contact with the lower shear blade, as has been heretofore explained, a guide or abutment 9 is provided adjacent to the path of travel of the mold charges 7. The distance from the guide 9 to the feeding axis of the feeder is substantially equal to the radius of a mold charge and as a result the guide braces or steadies the mold charge during the severing operation and opposes the displacing or "batting" tendency of the lower shear blade. The guide 9 is preferably of an arcuate or concave configuration conforming approximately to the contour of the mold charge and is provided with a shank portion 10 which is slidably mounted in a holder 11. The holder 11 is provided with a retaining plate 12 which may be removed in order to substitute guides of different sizes according to the size and shape of the mold charges being delivered by the feeder.

The guide is adjusted towards or away from the feeding axis of the apparatus by any convenient adjusting means, herein shown as a screw 13, which is mounted in the holder 11 and threaded into the shank 10 of the guide. The holder 11 is provided with an arm 16 which is adjustably secured by a bolt 17 to a bracket 18, carried by a fixed portion of the feeding apparatus in order to permit the guide to be adjusted in a direction at right angles to the adjustment obtained by the screw 13. By means of this construction the gudie 9 may not only be accurately adjusted with respect to mold charges of different shapes, weights and sizes, and its position maintained constant irrespective of any adjustment of the shear blades, but the adaptability of the guide for independent adjustment in two directions at right angles to each other permits it to be positioned to oppose any tendency of the shear blades to throw the charge in an angular direction relative to their path of travel.

In Figs. 3 and 4 a modified structure is illustrated in which the mold charge guide 9 is mounted for reciprocation toward and away from the feeding axis of the feeder in timed relation with the movement of the shear blades. The shank portion 10 of the guide is detachably secured to a block 19 carried by a piston rod 20 and is also susceptible of adjustment in a direction at right angles to the direction of reciprocation. The rod 20 extends entirely through a fluid pressure cylinder 21, and is provided with the usual piston 22. The cylinder 21 is carried by a bracket 23, secured to a fixed portion of the feeding structure. The guide 9 and block 19 are prevented from rotating on or with the piston rod 20 by means of a guide rod 24, which is secured to the guide supporting block 19 and which extends in parallel relation to the axis of the piston 22 for slidable engagement with a guideway 25 provided adjacent to the cylinder 21. The guide 9 is reciprocated toward and from the axis of the feeder by air under pressure which is admitted to the cylinder 21 through ports 26, the movement of the guide 9 toward such axis being limited by adjusting nuts 27, which are threaded onto the end of the piston rod 20. Any well known suitable valve mechanism or timing device, not shown, is provided for controlling the flow of air to and from the cylinder, whereby the guide 9 is moved to an operative position adjacent to a mold charge in advance of the action of the shear blades and remains in such position at least during the completion of the severing operation.

Any suitable cooling means may be provided for the charge guide. For example, in the structure shown in Figs. 1 and 2, the guide may be cored out to permit a cooling medium to be circulated therethrough and in the structure shown in Figs. 3 and 4, in which the guide is withdrawn from the path of travel of the mold charges at the completion of the severing operation, a suitable spraying device may be provided at its withdrawn position in order to maintain the guide at the proper working temperature.

From the foregoing it will be apparent that the present structure will not only prevent a mold charge from becoming displaced or deflected by the severing action of the shear blades, but that these blades may be removed for sharpening, repairing or replacement, or be adjusted to obtain the desired severing conditions without disturbing the adjusted position of the charge guide, and that this guide occupies a stationary operative position during the severing operation, independently of any movement of the shear blades.

The particular embodiment of the invention illustrated and described has been selected by way of example only, and it is to be understood that various modifications, arrangements and combinations may be employed in fulfilling the invention, as defined in the appended claims.

I claim:

1. In combination with a glass feeding mechanism arranged to deliver molten glass through a downwardly opening outlet in a succession of pendant masses, a pair of shear blades arranged to meet periodically beneath said outlet and in axial alignment therewith to sever mold charges from said masses, and a guide mounted independently of said shear blades and located only at the side of the path of travel of said charges opposite to the side from which the lower shear blade approaches the said path of travel of the charges, for opposing the deflection of a charge in its path of travel by the action of said shear blades.

2. In combination with a glass feeding mechanism arranged to deliver molten glass through a downwardly opening outlet in a succession of pendant masses, a pair of shear blades arranged to meet periodically beneath said outlet to sever mold charges from said masses, and a guide mounted independently of said shear blades and located only at the side of the path of travel of said mold charges opposite to the side from which the lower shear blade approaches the said path of travel of the charges, for opposing the deflection of a charge in its path of travel by the action of said lower shear blade.

3. In combination with a glass feeding apparatus embodying a mold charge severing device, a movable mold charge guide adapted to occupy a stationary position adjacent to a mold charge and at one side of the axial line of the feeding outlet of said apparatus during a portion of the severing operation to prevent said mold charge from being tilted by said operation and means for moving the guide in timed relation to the severing device.

4. In combination with a glass feeding mechanism embodying a mold charge separating device, a movable charge guide mounted independently of said separating device for adjustment relative to the feeding axis of said mechanism and always at one side of said feeding axis and means for moving the guide at the formation of each mold charge.

5. In combination with a glass feeding mechanism embodying a mold charge severing device, a movable guide mounted independently of the severing device and operated in timed relation therewith to occupy an operative position at one side only of a mold charge in advance of its severance by said device, and means for adjusting the guide laterally of the line of travel of the severing device.

6. In combination with a glass feeding mechanism embodying a mold charge separating device, a movable guide mounted to occupy a stationary operative position adjacent to and at one side of the feeding axis of said mechanism in advance of the formation of a mold charge by said separating device to prevent the charge from being deflected from the feeding axis of said mechanism by the action of said separating device, and means for moving the guide in timed relation with the separating device.

7. In combination with a glass feeding mechanism embodying a mold charge severing device, of a stationary support mounted adjacent to said device, a movable charge guide adjustably mounted on said support, means for adjusting the guide relative to the axis of the severing device, and means for moving the guide during the formation and severing of a mold charge.

8. In combination with a glass feeding mechanism embodying a mold charge severing device, a stationary support mounted adjacent to said device, a charge guide movably mounted on said support, and means for moving the charge guide in timed relation with the severing device.

9. In combination with a glass feeding mechanism embodying a mold charge severing device, a stationary support mounted adjacent to said device, a guide mounted on said support for movement toward and away from the feeding axis of said mechanism, and means for moving the guide in timed relation with the severing device.

10. In combination with a glass feeding mechanism embodying a mold charge severing device, a support mounted adjacent to said device, an arcuate guide movably carried by said support, and means for moving said guide toward and away from the feeding axis of said mechanism, and means for moving the guide in timed relation to the severing device.

11. In combination with a glass feeding mechanism embodying a mold charge severing device, a support mounted adjacent to said device, an arcuate guide movably carried by said support, and means for moving said guide toward and away from the feeding axis of said mechanism during formation and severing of the mold charge.

12. In combination with a glass feeding mechanism embodying a mold charge severing device, a support mounted adjacent to said device, a guide movably carried by said support and fluid pressure means for moving said guide toward and away from the axis of said mechanism.

13. In combination with a glass feeding mechanism embodying a mold charge severing device, a support mounted adjacent to said device, a guide movably carried by said support, means for moving said guide toward and away from the feeding axis of said mechanism, and means for limiting the movement of said guide toward said axis.

14. In combination with a glass feeding mechanism embodying a mold charge severing device, a support mounted adjacent to said device, an adjustaable guide movably carried by said support, means for moving said guide toward and away from the feeding axis of said mechanism in timed relation to the severing device, and means for adjustably limiting the movement of said guide toward said axis.

15. The combination with a glass feeding mechanism provided with meeting shear blades for severing the glass, of a mold charge guide mounted independently of said shear blades at one side of the path of travel of the mold charges delivered by said feeding mechanism, and means for adjusting the guide toward and from the lower shear blade.

16. The combination, with a glass feeding mechanism provided with meeting shear blades for severing the glass that are adjustable in position and in the degree to which they overlap when closed, of a mold charge guide mounted independently of said shear blades on one side of the path of travel of the mold charges delivered by said feeding mechanism, the said mold charge guide being adjustable independently of said shears and in two horizontal directions, and having its working face curved to conform approximately to the curvature of said mold charges.

17. In combination with a glass feeding mechanism arranged to deliver molten glass through a downwardly opening outlet, a pair of shear blades arranged to meet periodically beneath said outlet to sever mold charges from the issuing glass, a guide mounted at one side of the path of travel of said charges for opposing the deflection of the charges from their path of travel by the action of said shear blades, means for adjusting the guide toward and from the lower shear blade, and means for adjusting the guide laterally relative to the line of travel of said shear blades.

18. In combination with a glass feeding mechanism embodying a mold charge severing device, a support mounted adjacent to the severing device and independently of said device, a guide movably carried by said support, means for adjusting the support relative to the path of travel of the discharged glass, and means for adjusting the guide on the support laterally relative to the line of travel of the severing device.

19. In combination with a glass feeding mechanism embodying a mold charge severing device, a mold charge guide mounted adjacent to the severing device and independently thereof, a fluid pressure cylinder and piston for supporting and actuating the guide toward and from the path of travel of the discharged glass, means for adjusting the limit of travel of the piston, and means for adjusting the guide on the piston support relative to the line of travel of the severing device.

20. In combination with a glass feeding mechanism embodying a mold charge severing device comprising a pair of shears, a detachable mold charge guide mounted adjacent to the severing device and independently thereof, a fluid pressure cylinder and piston for supporting and actuating the guide toward and from the path of travel of the discharged glass and in timed relation with the shears, means for adjusting the limit of travel of the piston toward and from the glass, and means for adjusting the guide on the piston support laterally relative to the line of travel of the shears.

21. In combination with a glass feeding mechanism embodying a mold charge severing device, a support mounted adjacent to said device, a detachable guide movably carried by said support, means for moving said guide toward and away from both the path of travel of the discharged glass and a cutting edge of the severing device in timed relation to the severing device, and means for laterally adjusting the guide relative to the line of travel of the severing device, said means being adapted to permit removal of the guide from its support and replacement by another guide of different size or shape, to accommodate mold charges of different size.

22. In glass feeding apparatus, a severing device having a cutting edge movable transversely through a freely hanging mass of molten glass to sever a mold charge therefrom, and a guide independent from said severing device and movable at the side of the axial line of said suspended mass substantially opposite to said cutting edge to and from position to prevent lateral "batting" of the mold charge at the time of its severance.

Signed at Hartford, Connecticut, this 1st day of December, 1923.

KARL E. PEILER.